Patented Aug. 4, 1942

2,292,012

UNITED STATES PATENT OFFICE 2,292,012

PROCESS FOR THE PREPARATION OF INSULATION MATERIAL

Joseph R. Parsons, Chicago, Ill., assignor to United States Gypsum Company, Chicago, Ill., a corporation of Illinois No Drawing. Application October 6, 1938, Serial No. 233,519

3 Claims. (Cl. 106—40)

This invention relates to an insulating product and more particularly to a lightweight heat- and sound-proof material which may be produced by substantially dry pressing.

A number of methods have been proposed in the past for producing lightweight insulating products from ceramic and cementitious materials. These have consisted in general in the preparation of a slurry or mud suspension with which may be incorporated various substances such as wood fibers, naphthalene, gas bubbles, foam, and the like, in order to impart to the resulting hardened product the desired light weight. In the preparation of ceramic materials the wood or naphthalene contained therein may burn out during the firing process, leaving voids within the material, whereby a porous product results.

The processes of the prior art for producing cellular masses from argillaceous or cementitious materials have not been entirely satisfactory because of the shrinkage which occurs due to drying and the removal of the large quantities of water from the material before or after the setting or stiffening thereof. Also, the cost of drying such materials has been prohibitive in many instances, particularly in the preparation of lightweight ceramic masses wherein it is necessary to dry the shaped mass previous to the firing operation.

It has been recognized in the past that it would probably be desirable to produce at least certain cementitious and ceramic products by means of a dry-pressing operation, thus eliminating the necessity of adding the large quantities of water that are now employed in the process of their manufacture.

It has been found that a lightweight insulating material may be produced from argillaceous or cementitious materials if the materials are incorporated directly and in a substantially dry condition with a stable tenacious foam which in itself carries sufficient water to assist in the formation of a bond between the particles.

The foam is preferably of such character that it is almost impossible to destroy it during the kneading operations that are attendant to incorporating the foam with the dry clay or cementitious material. The foam may contain a sufficient amount of water to bind the clay in case an argillaceous material is employed, or to cause the cement or plaster to set in case a cementitious material is employed. The resulting mixture of foam and cementitious or argillaceous material may then be pressed and permitted to become set, or dried, and then fired in accordance with the conventional processes well known to those skilled in the art.

One object of this invention is to provide a cellular ceramic material which may be formed by a substantially dry pressing operation.

A further object of this invention is to provide a lightweight cellular product capable of being formed and ready to use upon hardening without any intermediate drying stages.

A further object of this invention is to provide a process for producing a lightweight cementitious mass without the addition of undue amounts of liquid in order to render the same plastic before setting or hardening.

Further additional objects will appear from the following description and the appended claims.

As stated above, the invention contemplates the incorporation of a tenacious foam, carrying sufficient liquid with it, into a substantially dry binder, intermingling the same thoroughly to obtain a uniform distribution of the foam in the binder, shaping the mass and permitting the binder to harden in order to entrain the cellular structure of the foam within the final product. Suitable binders may be clay or other argillaceous materials, and cementitious substances such as Portland cement, plaster of Paris, and magnesium-oxychloride cement.

It will be recognized that the foam employed for incorporation into a substance of the type described should be sufficiently stable and tenacious to withstand the operation of mixing it with the dry material. As an example, one foam that has been found to be desirable has the following composition:

| | Per cent |
|---|---|
| Water | 95 |
| Bentonite | 3 |
| Soap bark | 1 |
| Karaya gum | 1 |

The soap bark may be dissolved in approximately 60% of the water, and the foam is developed in the resulting solution by brisk agitation with a wire whip or in any mechanically suitable foam-forming device. The bentonite and karaya gum may be thoroughly dispersed in the remainder of the water and then added to the foam gradually. It is desirable that the cell wall reenforcing material, such as the bentonite and karaya gum, be added to the foam after it has been formed. If these materials are added previous to the formation of the foam, a viscous solution usually results, from which it is difficult to obtain a satisfactory volume of reenforced foam. The foam produced in accordance with this method is stiff and tenacious and is suitable for incorporation with dry comminuted binders in accordance with this invention. It may have any desired density, suitable densities having been found to be between 14 to 18 pounds per cubic foot. The soap bark contains large proportions of saponins which are the foam-producing agents. The karaya gum and bentonite act to reenforce the foam bubbles in order to render them tenacious. The bentonite also appears to act as a lubricant, which permits the foam to be more readily incorporated into the clay or other dry material.

The foam described in the above example, as has been previously indicated, may be employed in connection with various types of products. In the following, an example will be given which will indicate the manner in which a lightweight cellular ceramic product may be produced in accordance with this invention.

Thus, in order to produce a dry-pressed brick, the several ingredients may be incorporated in the following proportions:

| | |
|---|---|
| Kaolin _____grams__ | 50 |
| "Grog" _____do____ | 50 |
| Foam_____cubic centimeters__ | 150–175 |

The "grog" may be insulating cellular brick that is crushed to about 30 mesh size and has a very small amount of water incorporated therewith, for example, from 4% to 6%, in order to prevent the "grog" from absorbing excess water from the subsequently added foam. A substantial proportion of the water from the foam is necessary for the creation of the temporary bond between the kaolin and the "grog." In this process the foam may be added to the mixed substantially dry material and kneaded thoroughly with it to obtain a thorough dispersion of the foam within the dry mixture. The blended material may appear to be in substantially a dry state, having substantially no plastic properties. It may then be placed in a dry press and molded under pressure to the desired shape and size in accordance with conventional practice. The resulting product may then be fired directly without preliminary drying. The small amount of moisture in it will evaporate in the kiln. The cellular ceramic material produced in accordance with this process has a marked cellular structure and retains its original shape without distortion or warping.

It is obvious that other materials may be employed in carrying out the process in accordance with this invention. They may be used in varying proportions depending upon the amount of foam employed, the type of foam, the particular type of pressing operation, and the characteristics desired in the resulting product.

In the manufacture of ceramic products, as indicated above, it may be desirable in certain instances to incorporate vegetable fibers or wood flour into the mass previous to the molding or pressing operation. These materials may burn out during firing, thus providing connections for the cellular spaces within the material. This type of structure has been found particularly desirable in acoustical materials.

This process may also be employed for the production of cellular cementitious articles, as has been previously indicated. In such instances, the water of the foam is preferably present in sufficient amounts to react with the cementitious material and permits the product to set up or harden after forming. Subsequent drying operations are thus rendered unnecessary.

While a particular embodiment of this invention is shown above, it will be understood, of course, that the invention is not to be limited thereto, since many modifications may be made; and it is contemplated, therefore, to cover by the appended claims any such modifications as fall within the true spirit and scope of this invention.

I claim:

1. The method of producing a lightweight building material which comprises thoroughly incorporating a tenacious foam with a substantially dry comminuted hardenable material to form a loose, lightweight, substantially noncohesive mass, shaping said mass under pressure, and hardening the same, said foam comprising soap bark, karaya gum, bentonite, and water, the total amount of water being only sufficient to bind the pressed lightweight mass previous to hardening.

2. The method of producing a lightweight ceramic material which comprises incorporating a tenacious foam directly with a substantially dry mixture of comminuted argillaceous material in such an amount to form a loose, lightweight, substantially noncohesive mass, dry-pressing said mass and firing the same, said foam comprising water, soap bark, karaya gum, and bentonite.

3. The method of producing a lightweight building element which comprises thoroughly incorporating a tenaceous foam with a substantially dry comminuted cementitious material, to form a loose, lightweight, substantially noncohesive mass, shaping said mass under pressure, and effecting the setting and hardening of the same, said foam comprising soapbark, karaya gum, bentonite, and water, the total amount of water being only sufficient to effect the setting of said cementitious material and to bind the pressed lightweight mass previous to setting and hardening.

JOSEPH R. PARSONS.